Sept. 3, 1940.                    W. R. HULL                    2,213,220
                              SCROLL SHEAR DIE
                             Filed April 25, 1939
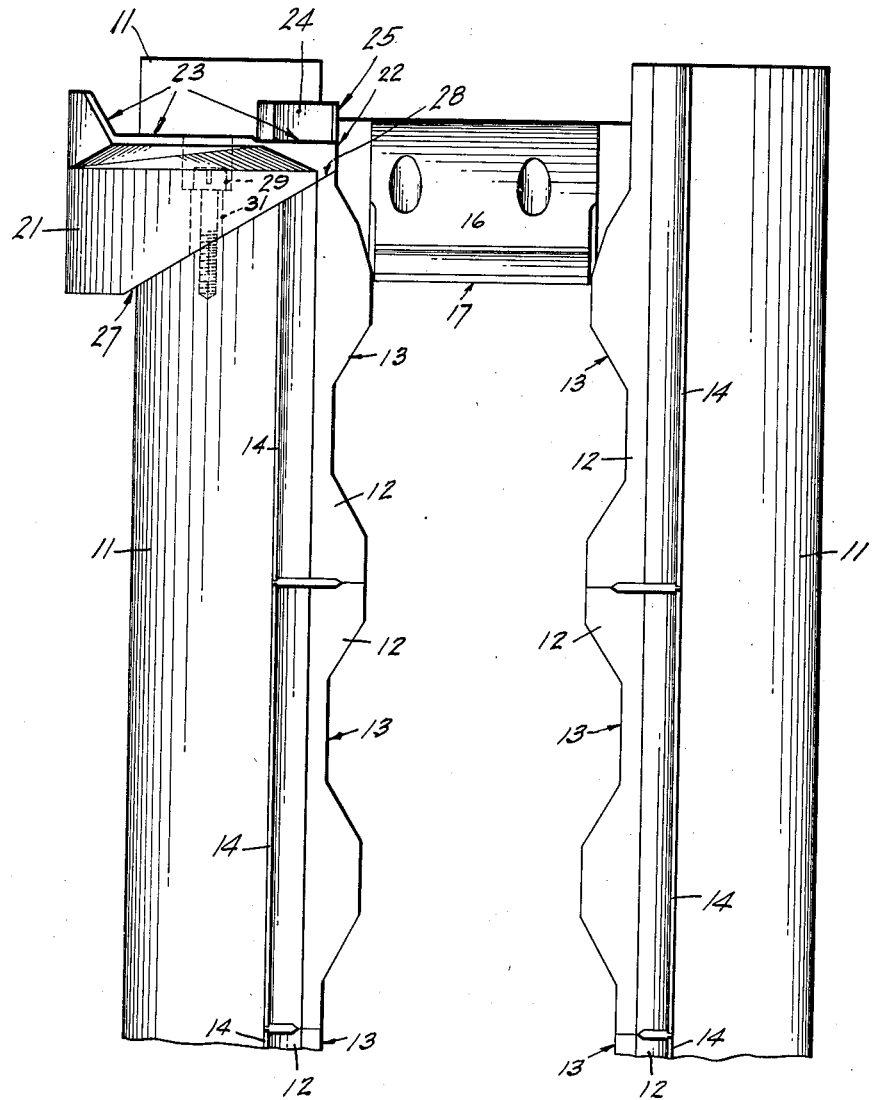
INVENTOR
Wilson R. Hull
BY
ATTORNEYS Patented Sept. 3, 1940

2,213,220

UNITED STATES PATENT OFFICE 2,213,220

SCROLL SHEAR DIE

Wilson R. Hull, Mamaroneck, N. Y., assignor to American Can Company, New York, N. Y., a corporation of New Jersey Application April 25, 1939, Serial No. 270,024

3 Claims. (Cl. 164—29)

The present invention relates to scroll shear dies for cutting sheet metal, such as tin plate and the like, and has particular reference to an adjustable trimming blade used in such dies.

In the can making industry scroll shear dies are widely used for cutting sheets of tin plate and the like into strips having undulated edges so that circular or ovaloid blanks may be subsequently cut from the strips with a minimum of waste. These blanks later are formed into can parts. In the cutting of such scroll strips at least one end edge is usually trimmed off by a trimming blade so that this edge may be subsequently used as a gaging edge for automatically feeding the strips through a punch press to cut blanks from the strips and draw or otherwise form the can parts.

Such a scroll shear die is normally constructed in sections so that when sharpening of the die cutting edges, including the trimming blade cutting edges, is required the sections may be readily removed for grinding. When the ground die sections are replaced in the die block, according to such usual practice, their cutting edges must of necessity be the proper dimensions and must be aligned in the same relative position as they were before sharpening. This requires backing up the die sections with shims since some of the stock is removed in grinding.

However, when a reground trimming blade is shimmed out into proper position for its cutting edges, a small space is left between the blade and its adjacent cooperating die section. Hence, when tin plate is cut in such a die the portion of the plate which bridges the space is torn across in a jagged edge instead of being cut or sheared in a clean sharp edge. This leaves an undesirable but unavoidable burr on the strip which interferes with subsequent automatic feeding of the strips.

The present invention contemplates overcoming this difficulty by providing a trimming blade having a wedge shape and which is adapted to fit against a sloping seat so that when required to be reground, the sharpened blade may be pushed forward in its seat and this eliminates the space between it and its adjacent cooperating die section.

An object therefore of the invention is the provision, in a scroll shear die, of a trimming blade of wedge shape and having a cooperating seat in the die block which permits adjustment of the blade relative to its adjacent die part after being ground so that there will always be provided a continuous and coextensive cutting edge at the junction of the trimming blade and the adjacent die part.

Another object is the provision of such a trimming blade wherein adjustment of the blade in one direction positions its cutting edges along two adjoining sides in the proper relation to the remainder of the die parts of the scroll shear die and this insures proper trimming of strips cut by the die.

Numerous other objects and advantages of the invention will be apparent as it is better understood from the following description, which, taken in connection with the accompanying drawing, discloses a preferred embodiment thereof.

Referring to the drawing:

The single figure is a top plan view of a scroll shear die having a trimming blade embodying the instant invention, parts of the die being broken away.

As a preferred embodiment of the invention the drawing illustrates one end of a conventional scroll shear die for cutting scroll strips from sheets of tin plate. The die includes a die block 11 which supports die members 12 arranged in two parallel rows and provided with undulated cutting edges 13 which cooperate in forming a continuous scroll shaped cutting edge along the two longitudinal sides of the die. These die members are secured in place in the die block in the usual manner. Shim plates 14 are interposed between the back of the die members and the block.

At the end of the die block 11 there is located a cut-off die steel 16 having a straight cutting edge 17 which completely bridges the gap between the end die members 12. This cutting edge is slightly depressed below the top surface of the cutting edges 13 of the die members 12 for the purpose of severing, from the end of the strip of tin plate, the recovery piece well known to those familiar with the scroll shear art.

The trimming of the tin plate sheet for gaging purposes takes place adjacent and to one side of the recovery die steel 16. For this purpose there is provided a trimming element or blade 21 having a front cutting edge 22 which is coextensive with and contiguous to the cutting edge 13 of the adjacent die member 12 and also having a side cutting edge 23 which is preferably disposed at right angles to the front cutting edge and adjoins therewith. A cut-off die member 24 is disposed adjacent the trimming element 21 against the side having the cut edge 23 and this die member is provided with a cut edge 25 which is coextensive with the front cut edge 22 of the trimming element. This cut-off die member continues the scroll cutting edge out to the end of the scroll die proper.

The side of the trimming element 21 adjacent the cooperating die member 12 is beveled off at an angle to the front cut edge 22 thus providing a sloping side 27 which gives the trimming element a wedge shape. The narrowest portion of the wedge is at the front cutting edge 22. This sloping side 27 of the element seats against a cooperating sloping seat 28 formed at the end of the die block 11 and at the end of the adjacent die member 12.

The trimming element is secured in place against the seat 28 by a cap screw 29 which extends through a slot 31 formed in the element, the inner end of the screw being threaded into the die block. Thus by loosening the trimming blade and pushing it forward along its seat its cut edge 22 may be advanced and at the same time its cut edge 23 may be extended outwardly.

Hence as the trimming blade is ground off along its two cutting edges 22, 23 to correspond with a similar grinding of the die blocks 12, the blade may be pushed forward in its seat, the slot 31 permitting such a movement, to reposition the cutting edges into their original location without leaving any space between the inner side edge of the blade and the adjacent die member.

With this construction of wedge shaped trimming die and sloping seat, the front cut edge 22 of the blade will always be coextensive with the cutting edges of the die members 12 and with the cut-off member 25. This provides one unbroken or continuous cutting edge which will cut a clean line of severance.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a scroll shear die, the combination of a die member having a cutting edge adapted for sharpening after wear to recondition it for use, and a trimming element having a cutting edge also adapted for sharpening after wear, said die member and said trimming element being independently movable for resetting into a predetermined position after sharpening, said trimming element being so shaped that it will by said resetting movement maintain with the cutting edge of said die member a continuous unbroken line of cut irrespective of any alteration in said trimming element as a result of such sharpening.

2. In a scroll shear die, the combination of a die member having a cutting edge adapted for sharpening after wear to recondition it for use, and a trimming element having a cutting edge and also a trimming edge which is at an angle to its cutting edge, said edges being also adapted for sharpeninng after wear, said die member and said trimming element being independently movable for resetting into a predetermined position after sharpening, said trimming element being so shaped that it will by said resetting movement maintain with the cutting edge of said die member a continuous unbroken line of cut irrespective of any alteration in said trimming element as a result of such sharpening, said trimming edge being brought into desired position in such setting without changing the line of cut.

3. In a scroll shear die, the combination of a die block, a die member mounted in said die block and having a cutting edge adapted for sharpening after wear to recondition it for use, said die block being formed with a sloping seat at an angle to said cutting edge and a wedge shaped trimming element mounted on said die block seat and having a cutting edge and also a trimming edge which is at an angle to its cutting edge, said edges being also adapted for sharpening after wear, said die member and said trimming element being independently movable for resetting into a predetermined position after sharpening, said trimming element being so shaped that it will by said resetting movement maintain with the cutting edge of said die member a continuous unbroken line of cut irrespective of any alteration in said trimming element as a result of such sharpening, the sloping wall of said trimming element cooperating with the sloping seat of said die block to bring the element's trimming edge into desired position in such setting without changing the line of cut.

WILSON R. HULL.